United States Patent

Leibinsohn 3,690,312

Sept. 12, 1972

[54] VENOUS PRESSURE MANOMETRIC WITH LEVEL MAGNIFYING MEANS

[72] Inventor: Saul Leibinsohn, 11 Hagardom St., Rishon Lezion, Israel

[22] Filed: Dec. 16, 1969

[21] Appl. No.: 885,416

[52] U.S. Cl. ............... 128/205 D, 73/327, 128/214 R
[51] Int. Cl. .................................................. A61b 5/02
[58] Field of Search ....... 128/2.05 D, 2.05 N, 2.05 R, 128/214 R, DIG. 13; 73/323, 327, 401, 402

[56] References Cited

UNITED STATES PATENTS

| | | | |
|---|---|---|---|
| 2,113,662 | 4/1938 | McClain | 73/327 |
| 1,488,403 | 3/1924 | Macbeth | 73/327 |
| 3,495,585 | 2/1970 | Halligan et al. | 128/2.05 D |
| 1,900,286 | 3/1933 | Huber et al. | 128/2.05 N |

FOREIGN PATENTS OR APPLICATIONS 1,521,639   3/1968   France................128/2.05 D

*Primary Examiner*—William E. Kamm
*Attorney*—Ostrolenk, Faber, Gerb & Soffen

[57] ABSTRACT

Venous pressures are easily and accurately measurable with a manometric device, closed at one end to substantially lessen the possibility of retrograde infection and having a sight glass affixed to a graduated ruler backing to align the zero level thereof with a patient's zero level. The reservoir of the device is comprised of a transparent plastic tube overlying a pattern imprinted along the length of the ruler, and is filled with a transparent liquid, the level of which provides the pressure indication. The transparent plastic tube by itself operates as a divergent lens to reduce the apparent size of the overlaid pattern in that portion of the tube filled by air, while the transparent tube and liquid operate as a convergent lens to increase the apparent size of the pattern beneath the liquid filled portion of the tube, thereby emphasizing the level to which the fluid surface extends.

8 Claims, 4 Drawing Figures

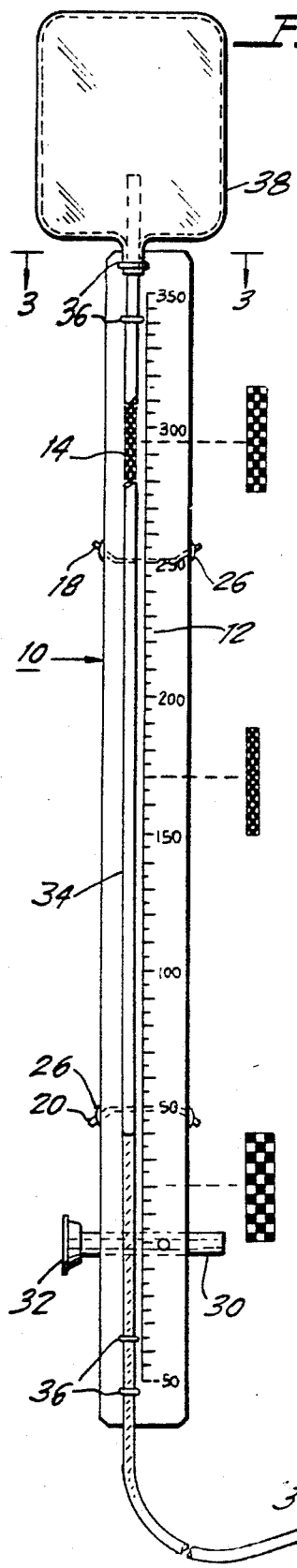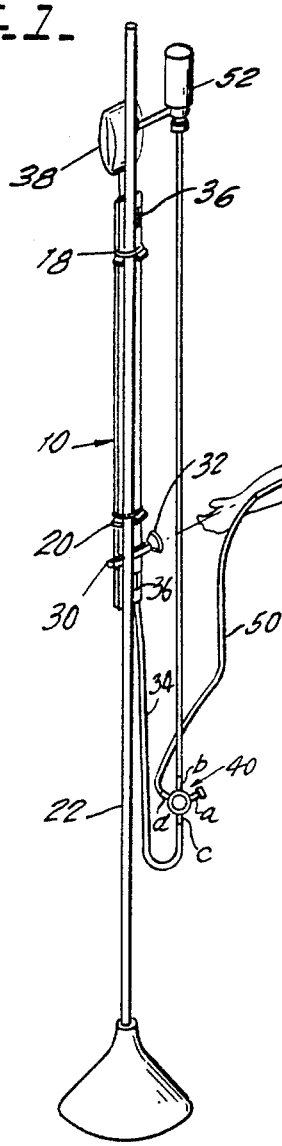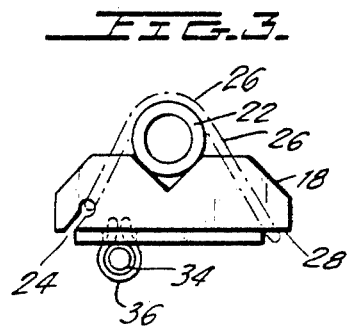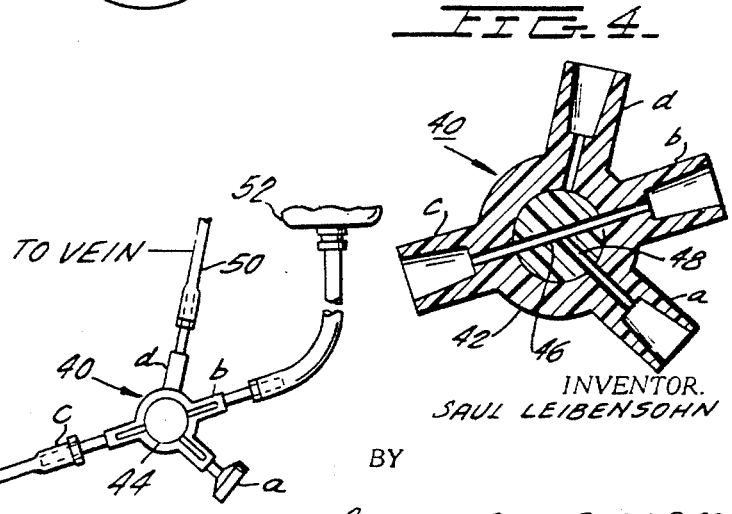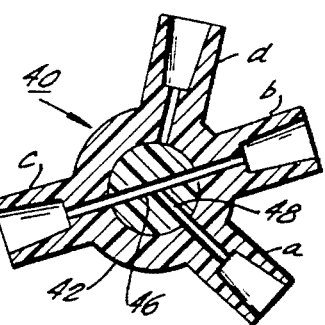
PATENTED SEP 12 1972
3,690,312
INVENTOR.
SAUL LEIBENSOHN
BY Ostrolenk, Faber, Gerb & Soffen
ATTORNEYS

VENOUS PRESSURE MANOMETRIC WITH LEVEL MAGNIFYING MEANS

This invention relates to apparatus for the measurement of fluid pressures within the vessels or organs of humans, animals or the like, in general, and to closed end manometric devices for the measurement of fluid pressures through direct contact with the fluid, in particular.

As is well known, manometric devices are oftentimes employed in the case of humans to measure the pressure in the vascular system as part of a diagnosis of pathology, as a laboratory routine for certain ailments, and as an ascertainment of the progress of therapy. As is also well known, such devices are oftentimes used in conjunction with a stop cock device which selectively interconnects a plurality of fluid-carrying ducts in a variety of configurations. In such instance, a first port of of the stop cock may be connected to a hypodermic needle inserted in the patient, a second port may be connected to an apparatus administering infusions, a third port may be connected to an apparatus for administering selected drugs and taking blood samples, and a fourth port may be connected to a pressure recording device—of the type herein described, for example. A rotatable plug is usually provided within the casing of the stop cock to selectively connect these ports in desired combinations.

As will become clear hereinafter, the manometric device of the present invention represents an improvement over prior art configurations in at least three respects. First of all, the device of the invention is of the "closed end" variety, having a polyethylene or polyvinylchloride bag into which air dispelled from the tube upon displacement of the measuring liquid therein can collect, without contamination by dust or bacteria. Use of an impervious bag of this type substantially lessens the possibilities of retrograde infection, by preventing external dust and bacteria from entering the tube and making their way through the measuring liquid to the body fluids undergoing pressure measurement.

A second advantage of the device of the invention resides in the use of a sight glass or viewer affixed to the ruler or backing of the manometric unit at the zero level of its graduated scale. Through this sight glass, one can align the zero level of the scale with the zero level of the patient, usually his right atrium. As will be readily appreciated, such alignment is necessary for accurate pressure measurements to be had, and is utilized in taking measurements of patients in different positions of sitting and reclining. Where the patient changes position, the manometric unit can be adjusted up or down, as necessary, until the proper zero level alignments are sighted through the viewer.

A third feature of the invention resides in the degree to which the fluid surface of the measuring liquid is discernible. In particular, the manometric tube is selected to be transparent and is used as a reservoir to retain the measuring liquid, also selected to be transparent. The tube is arranged to overlay a pattern imprinted on the manometer backing, such that, in the region where the tube is filled only with air, a divergent lens effect is produced, by which the pattern is made to appear of reduced size. In the region where the manometric tube is filled with the transparent liquid, on the other hand, a convergent lens effect is produced, whereby the pattern appears to be of increased size. The overall effect is to emphasize the level to which the transparent liquid rises in the tube and to thus enhance the ease with which pressure readings can be taken.

These and other advantages of the invention will be more fully understood from the following description, taken in connection with the accompanying drawings in which:

FIG. 1 is a front elevation view of an improved manometer embodying the principles of the present invention attached to an intravenous holding pole;

FIG. 2 is a perspective elevation view of the manometer of FIG. 1; and

FIG. 3 is a top view of the device of that drawing.

FIG. 4 is a cross-sectional view of a stop cock made in accordance with one aspect of this invention.

DESCRIPTION OF THE MANOMETRIC DEVICE OF THE PRESENT INVENTION

As shown in the drawings, the manometric device of the invention includes a ruler or backing 10, along one side of which a graduated scale 12 of venous pressures of a human subject is imprinted. Along the opposite side of the ruler 10 is positioned a repetitive pattern 14, illustratively shown as alternating light and dark areas. For purposes of discussion, the dark areas and the gradations may each be imprinted in green on a white background, white in this instance comprising the color of the light areas of the pattern.

Peripheral venous pressure is conventionally expressed in terms of the number of millimeters of water supported in a constant diameter tube by the hydraulic pressure within the vein. The standard reference or zero level point, by general agreement, is the approximate level of the right atrium of the heart. In the normal individual, the venous pressure varies between 80 and 100 mm in the resting state while in pathological states, it may vary from −20 mm to over 300 mm. Thus, as shown in FIG. 1, the gradations of the scale 12 are measured in mm of length, with the notations proceeding upwards of the zero level constituting positive pressures in mm up to +350 and with the gradations below the zero level constituting negative pressures in mm down to −50.

A pair of curved mounting tabs 18, 20 are secured to the back side of the ruler 10, and are used to secure it to an intravenous pole or similar such infusion stand 22 to hold the manometric device in a substantially vertical position. As shown, a first corner 24 of each tab is slotted to receive a stretchable or elastic band 26 of a diameter greater than that of the slot so as to firmly hold the band in the end region thereof. The central portion of the tab is cut in a "V" to centrally position the ruler 10 along the intravenous pole 22, with the band 26 encircling the pole 22 and linking up with a second corner 28 of each tab to hold the ruler in place. It is to be understood that this "holding in place" is not so firm as to prevent adjustment of the ruler 10 up or down, in a manner to be described below. The mounting tabs 18 and 20 are shown as curved in opposite directions to enhance the rigidity of the ruler 10.

As was previously mentioned, in taking venous pressure measurements, it is first necessary to position the zero level of the graduated scale 12 with the zero level of the patient, i.e., at the same approximate height above the floor as is the patient's right atrium. To aid in this alignment, the device of the invention includes a sight glass 30 secured to the back side of the ruler 10 such that the longitudinal axis of the glass 30 coincides with the zero level on the scale 12. It will be understood in this respect that the sight glass 30 has an opening along its axial length, through which one can check the zero level alignments. The reference numeral 32 in this respect represents the eye piece of the sight glass 30, which is shown in the drawing as being a rectangular solid of some 2 inch length.

The manometer of the drawings further includes a transparent plastic tube 34—of polyvinyl chloride, for example—which serves as a constant diameter reservoir for a transparent pressure indicating liquid. The tube 34 is secured to the ruler 10 by a pair of stretchable bands 36, similar in type to that securing the instrument to the intravenous pole. Each of these bands 36 resides within a pair of perforations in the ruler 10, and is arranged to form a loop through which the tube 34 is inserted and by means of which the tube 34 is held in position overlying the light and dark pattern 14.

At the upper end of the transparent tube 34, a bag 38 is shown, which serves to close the tube. The neck portion of the bag 38 fits over the uppermost part of the tube 36 and is held secured thereto by the band 36 holding the upper end of the tube against the ruler 10. The bag 38 may be constructed of polyethylene, polyvinylchloride, or any other material which is impervious to air. When, in operation, the level of the liquid in the reservoir tube 34 is raised, the air in the tube displaced as a result is dispelled into the impervious bag 38. The construction of the bag permits its expansion as more and more air is dispelled into it by rising liquid levels, but the construction is such as to prevent dust or bacteria from entering the bag from the external atmosphere. In this manner, these contaminants are prevented from reaching the measuring liquid and penetrating back to the body fluid undergoing pressure measurement.

Also shown in the drawings, is a stop cock 40 of the type described in pending application Ser. No. 714,644, filed Mar. 20, 1968 (now abandoned), and the streamlined continuation thereof application Ser. No. 48,807 filed June 8, 1970. Such a unit selectively interconnects a plurality of fluid carrying ducts in a variety of configurations, particularly, by positioning four ports $a$–$d$ in the casing 42 thereof in such a manner that three of the ports $a$, $b$, $d$ form angles of 60° with respect to one another while the fourth port $c$ is positioned diametrically opposite from the central one of the first mentioned three ports $b$. A rotatable plug 44 is provided within the casing 12, and such plug is provided with a network of passageways—which include one passageway 46 diametrically through the plug and a second passageway 48 leading from the center of the passageway 46 radially toward the periphery of the plug at an angle of 60°. As shown, the port $a$ may be connected to an apparatus for administering selected drugs and taking blood samples, port $b$ may be connected to an apparatus for administering infusions, port $c$ may be connected to the pressure recording device of the invention, and port $d$ may be connected to a hypodermic needle inserted into the patient. In one embodiment of the invention, the transparent manometric tube 34 connected to the port $c$ through a 24 inch or so section while the port $d$ was connected to the hypodermic needle through a similar transparent tube 50 of some 10 inches in length.

In taking the venous pressure with this apparatus, the port b is connected to an intravenous infusion bottle 52 containing sterile isosmotic water, for example. The fluid is allowed to run into the reservoir tube 34 by rotating plug 44 to connect ports $b$ and $c$ until the tube 34 is almost full. Then plug 44 is rotated to close port $b$ and to connect port $c$ to port $d$ so that the isosmotic water is allowed to flow into the patient by gravity. The number of millimeters of water remaining in the transparent tube 34 at the time the water stops flowing represents the venous pressure. If the venous pressure falls, the isosmotic water will flow out of the reservoir of the tube 34 into the patient so that the level in the reservoir will fall with a fall in venous pressure. On the other hand, if the venous pressure rises, the level in the manometric tube 34 will also rise. Prior to this measurement, however, the zero level of the graduated scale 12 must first be adjusted to be in alignment with the right atrium zero level of the patient.

One important feature of the invention is that the manometer emphasizes at all times the precise level to which the indicating fluid rises in the reservoir tube. In that region where the tube is filled with the air column above the liquid, the transparent tube 34 provides a divergent lens effect, whereby the alternating light and dark area pattern 14 underlying the tube appears to be of reduced size. On the other hand, in the region where the tube 34 is filled with the transparent liquid, the effect provided is as if the tube and water comprised a convergent lens, to increase the size of the light and dark pattern 14. As will be seen from FIG. 1 of the drawings, that portion of the tube 34 below the 40 millimeter level is assumed to be filled with the transparent liquid, and the pattern 14 is shown larger than the pattern above that level, where the tube 34 is filled with air. This demarcation point is readily discernible from a distance of even 6 feet, much greater than the distance a user of the manometer normally would be positioned with respect to it. The overall effect, then, is to emphasize the precise point to which the fluid surface of the liquid rises. It will be seen that this discernability is far superior to that previously possible in prior configurations using a float in the manometer tube to bob along the surface of the liquid as that level was raised or lowered.

Although a preferred embodiment of the instant invention has been described, it will be apparent that many modifications to the design will readily occur to a person skilled in the art, without deviating from its teachings. Thus, the length of the scale could be made greater or less depending upon user requirements, while the ruler of the manometer could be clipped to the intravenous stand, rather than being secured thereto by elastic bands. Obviously, different type patterns may be imprinted on the ruler to underly the manometric tube, which could also be held in place in other ways. However, in all such cases, it would be readily apparent that the magnifying-minimizing lens affect of the water and air columns in combination with the transparent tube, will continue to be present.

The embodiments of the invention in which an exclusive privilege or property is claimed are defined as follows:

1. In a manometer for measuring venous pressure of the type having a transparent tubular reservoir of substantially constant diameter, means for connecting one end of the tubular reservoir to the vein of a patient, means supporting the tubular reservoir substantially vertically, a substantially planar surface disposed adjacent and behind the tubular reservoir, and a graduated scale disposed on the planar surface and facing the tubular reservoir for reading the level of a liquid contained within the reservoir for reading the level of a liquid contained within the reservoir as a representation of venous pressure at any given time, the improvement comprising:

a pattern of light and dark areas on the substantially planar surface adjacent the graduated scale, disposed directly behind and extending at least throughout the length of the reservoir in which the liquid level may be located, the pattern including light and dark areas having substantial extents in both the horizontal and vertical directions, the pattern appearing reduced in size to one viewing the same through the portion of the reservoir filled with air and appearing increased in size to one viewing the same through the portion of the reservoir filled with the liquid.

2. The improvement of claim 1 further comprising a zero level graduation on said graduated scale, and sighting means secured substantially at said zero level of said graduated scale for permitting accurate positioning of said zero level with the zero level of the patient whose venous pressure is being measured, said means permitting visual checking of the height of said manometer zero level with respect to the right atrium of the patient.

3. The improvement of claim 1 further comprising expansible and air impervious means coupled to the upper end of said tubular reservoir for receiving air dispelled therefrom by rising liquid surfaces and for permitting the return thereto upon the lowering of said surfaces, said means being impervious to dust and bacteria contaminants from external environmental conditions to reduce the possibility of infection by said contaminants of the venous fluids undergoing pressure measurement.

4. The improvement of claim 3 in which said dust and bacteria impervious means comprises a bag composed of one of polyethylene and polyvinylchloride material.

5. The improvement of claim 4 in which said transparent tubular reservoir is composed of polyvinylchloride and in which said transparent liquid is isosmotic water.

6. The improvement of claim 1, in which the pattern comprises alternate light and dark areas defining a checkered pattern, and in which a pair of stretchable bands are provided for securing the tubular reservoir to the planar surface.

7. In a manometer for measuring venous pressure of the type having a transparent tubular reservoir of substantially constant diameter open at both ends, means for connecting the lower end of the tubular reservoir to the vein of a patient, means supporting the tubular reservoir substantially vertically, a substantially planar surface disposed adjacent and behind the tubular reservoir, and a graduated scale disposed on the planar surface and facing the tubular reservoir for reading the level of a liquid contained within the reservoir as a representation of venous pressure at any given time, the improvement comprising:

a pattern of light and dark areas on the substantially planar surface adjacent the graduated scale, disposed directly behind and extending at least throughout the length of the reservoir in which the liquid level may be located, the pattern including light and dark areas having substantial extents in both the horizontal and vertical directions, the pattern appearing reduced in size to one viewing the same through the portion of the reservoir filled with air and appearing increased in size to one viewing the same through the portion of the reservoir filled with the liquid; and a plastic bag connected to the upper end of the tubular reservoir, the bag being impervious to atmospheric contaminants and thereby reducing the possibility of contamination of the liquid in the tubular reservoir.

8. The improvement of claim 7 in which said pattern comprises alternate light and dark areas in a checkered pattern.

* * * * *